United States Patent
Ko et al.

(10) Patent No.: US 12,388,136 B2
(45) Date of Patent: Aug. 12, 2025

(54) CYLINDRICAL SECONDARY BATTERY

(71) Applicant: Samsung SDI Co., Ltd., Yongin-si (KR)

(72) Inventors: Sung Gwi Ko, Yongin-si (KR); Gun Gue Park, Yongin-si (KR); Hyun Ki Jung, Yongin-si (KR); Myung Seob Kim, Yongin-si (KR); Yoon Sun Yoo, Yongin-si (KR); Woo Tae Jun, Yongin-si (KR); Gwan Hyeon Yu, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 18/485,692

(22) Filed: Oct. 12, 2023

(65) Prior Publication Data

US 2024/0356123 A1   Oct. 24, 2024

(30) Foreign Application Priority Data

Apr. 21, 2023   (KR) .......................... 10-2023-0052505

(51) Int. Cl.
*H01M 50/184* (2021.01)
*H01M 50/107* (2021.01)
(Continued)

(52) U.S. Cl.
CPC ....... *H01M 50/184* (2021.01); *H01M 50/107* (2021.01); *H01M 50/152* (2021.01);
(Continued)

(58) Field of Classification Search
CPC ............ H01M 50/184; H01M 50/107; H01M 50/152; H01M 50/167; H01M 50/186;
(Continued)

(56) References Cited

U.S. PATENT DOCUMENTS

2016/0087318 A1*  3/2016  Kim ................. H01M 50/3425
                                                               429/53

FOREIGN PATENT DOCUMENTS

CN        218827726 U     4/2023
EP          4376138 A1    5/2024
(Continued)

OTHER PUBLICATIONS

Korean Office Action issued in corresponding KR Application No. 10-2023-0052505, dated Apr. 17, 2024, 7 pages.
(Continued)

*Primary Examiner* — Matthew W Van Oudenaren
(74) *Attorney, Agent, or Firm* — Womble Bond Dickinson (US) LLP (57) ABSTRACT

A cylindrical secondary battery includes: an electrode assembly including a first electrode plate, a separator, and a second electrode plate; a cylindrical case accommodating the electrode assembly and electrically connected to the second electrode plate; a terminal coupled to a lower surface of the case through a first gasket and electrically connected to the first electrode plate; a cap plate sealing the upper end of the case; and a second gasket between the case and the cap plate, the second gasket having: a sidewall portion in close contact with a side surface of the case; and a bottom portion extending inwardly from a bottom end of the sidewall portion and having at least one opening formed therein. The bottom portion of the second gasket having flange parts extending from the sidewall portion in an edge region and a bridge part connecting the flange parts to each other.

19 Claims, 4 Drawing Sheets

(51) Int. Cl.
  *H01M 50/152* (2021.01)
  *H01M 50/167* (2021.01)
  *H01M 50/186* (2021.01)
  *H01M 50/533* (2021.01)
(52) U.S. Cl.
  CPC ....... *H01M 50/167* (2021.01); *H01M 50/186* (2021.01); *H01M 50/533* (2021.01)
(58) Field of Classification Search
  CPC ............ H01M 50/533; H01M 50/547; H01M 50/548; H01M 50/559; H01M 10/0422; H01M 10/0587
  See application file for complete search history.

(56) References Cited

FOREIGN PATENT DOCUMENTS

| | | | |
|---|---|---|---|
| JP | 4186485 B2 | 9/2003 | |
| JP | 4462944 B2 | 8/2005 | |
| JP | 2021-125304 A | 8/2021 | |
| KR | 10-2022-0118892 A | 8/2022 | |
| KR | 2022118892 A * | 8/2022 | ............ H01M 10/04 |

OTHER PUBLICATIONS

Extended European Search Report issued in corresponding EP Application No. 24162803.1, dated Oct. 25, 2024, 8 pages.

* cited by examiner

CYLINDRICAL SECONDARY BATTERY

CROSS-REFERENCE TO RELATED APPLICATION

The present application claims priority to and the benefit of Korean Patent Application No. 10-2023-0052505, filed on Apr. 21, 2023, in the Korean Intellectual Property Office, the entire disclosure of which is incorporated herein by reference.

BACKGROUND

1. Field

Aspects of embodiments of the present disclosure relate to a cylindrical secondary battery.

2. Description of the Related Art

Generally, a cylindrical secondary battery includes a cylindrical electrode assembly, a cylindrical can accommodating the electrode assembly and an electrolyte solution, and a cap assembly coupled to an opening at one side of the can to seal the can, The cap assembly is electrically connected to the electrode assembly to electrically connect an external component to the electrode assembly.

Cylindrical secondary batteries generally have a structure in which a can having a negative polarity and a cap having a positive polarity are insulated from each other by a gasket. In battery module including a plurality of cylindrical secondary batteries connected to one another, bus bars are connected to upper and lower portions (or ends) of the secondary batteries, respectively, complicating the battery module structure and increasing the process time.

In addition, because a gasket may undergo heat shrinkage deformation after injection, a gasket that resists deformation is required.

The above information disclosed in this Background section is for enhancement of understanding of the background of the present disclosure, and therefore, it may contain information that does not constitute prior art.

SUMMARY

Embodiments of the present disclosure provide a cylindrical secondary battery having an improved gasket structure.

A cylindrical secondary battery, according to an embodiment of the present disclosure, includes: an electrode assembly including a first electrode plate, a separator, and a second electrode plate; a cylindrical case accommodating the electrode assembly and electrically connected to the second electrode plate, an upper end of the case being open; a terminal passing through a lower surface of the case and electrically connected to the first electrode plate and coupled to the case through a first gasket; a cap plate sealing the upper end of the case; and a second gasket between the case and the cap plate to seal and insulate the case and the cap plate. The second gasket has: a sidewall portion in close contact with a side surface of the case; and a bottom portion extending inwardly from a bottom end of the sidewall portion and having at least one opening formed therein. The bottom portion of the second gasket has flange parts extending from the sidewall portion in an edge region and a bridge part connecting the flange parts to each other.

The sidewall portion of the second gasket may have a circular ring shape with open upper and lower portions.

The bottom portion of the second gasket may have a disk shape, and a diameter of the bottom portion may be smaller than a diameter of the case.

The second gasket may have a corner portion extending between the sidewall portion and the bottom portion.

The at least one opening may be between the bridge part or between the bridge part and the flange parts.

The at least one opening may have a triangular shape.

The bottom portion of the second gasket may have a round portion at an inner side of the at least one opening and may be bent in a round shape between the flange parts and the bridge part.

The bridge part may include one to twenty bridges.

The bridge part may have different thicknesses in some regions.

Steps may be formed between regions of the bridge parts having different thicknesses.

A thickness of the bridge part may be equal to or smaller than that of the flange parts.

A thickness of a portion of the bridge part may be equal to or smaller than that of the flange parts.

A thickness of a portion of the bridge part may be greater than that of the flange parts.

A thickness of the flange parts may be equal to or smaller than a thickness of the corner portion.

The at least one opening may have a circular shape.

The case may include: a crimping part bent inwardly at an upper portion of the cap plate to fix the cap plate; and a beading part recessed into the case at a lower portion of the cap plate.

The second gasket may be between the cap plate and the crimping part and between the cap plate and the beading part, and the cap plate may be non-polar.

The second gasket may have an upper end region on the sidewall portion, and the upper end region may be between an outer surface of an end of the cap plate and an inner surface of the crimping part.

The upper end region of the second gasket may protrude farther inwardly than the crimping part.

The cap plate may have an edge region between the crimping part and the beading part and a central region concavely formed in an outer direction of the case compared to the edge region.

The first electrode plate may have a positive electrode uncoated portion that is not coated with a positive active material that protrudes downwardly from the first electrode plate, and the second electrode plate may have a negative electrode uncoated portion that is not coated with a negative active material and protrudes upwardly from the second electrode plate.

The cylindrical secondary battery may further include a current collector plate having a circular plate shape corresponding to an upper surface of the electrode assembly and contacting and electrically connected to the second electrode plate exposed at the upper surface of the electrode assembly.

The current collector plate may have: a circular planar part contacting the upper surface of the electrode assembly; and an extension part extending upwardly from an edge of the planar part.

The extension part of the current collector plate may be between the second gasket and the beading part.

DETAILED DESCRIPTION

Embodiments of the present disclosure are provided below to more completely explain the present disclosure to those skilled in the art, and the following embodiments may be modified in various other forms. Thus, the present disclosure should not be construed as being limited to the embodiments set forth herein. Rather, these embodiments are provided so that this disclosure will be thorough and complete and will convey the aspects and features of the present disclosure to those skilled in the art.

In addition, in the accompanying drawings, sizes or thicknesses of various components are exaggerated for brevity and clarity. As used herein, the term "and/or" includes any and all combinations of one or more of the associated listed items. In addition, it will be understood that when an element A is referred to as being "connected to" an element B, the element A can be directly connected to the element B or an intervening element C may be present therebetween such that the element A and the element B are indirectly connected to each other. Further, the use of "may" when describing embodiments of the present disclosure relates to "one or more embodiments of the present disclosure." Expressions, such as "at least one of" and "any one of," when preceding a list of elements, modify the entire list of elements and do not modify the individual elements of the list. For example, the expression "at least one of a, b, or c" indicates only a, only b, only c, both a and b, both a and c, both b and c, all of a, b, and c, or variations thereof. As used herein, the terms "use," "using," and "used" may be considered synonymous with the terms "utilize," "utilizing," and "utilized," respectively. As used herein, the terms "substantially," "about," and similar terms are used as terms of approximation and not as terms of degree, and are intended to account for the inherent variations in measured or calculated values that would be recognized by those of ordinary skill in the art.

The terminology used herein is for the purpose of describing particular embodiments only and is not intended to be limiting of the disclosure. As used herein, the singular forms are intended to include the plural forms as well, unless the context clearly indicates otherwise. It will be further understood that the terms that the terms "comprise or include" and/or "comprising or including," when used in this specification, specify the presence of stated features, numbers, steps, operations, elements, and/or components, but do not preclude the presence or addition of one or more other features, numbers, steps, operations, elements, components, and/or groups thereof.

It will be understood that, although the terms first, second, etc. may be used herein to describe various members, elements, regions, layers and/or sections, these members, elements, regions, layers and/or sections should not be limited by these terms. These terms are only used to distinguish one member, element, region, layer and/or section from another. Thus, for example, a first member, a first element, a first region, a first layer and/or a first section discussed below could be termed a second member, a second element, a second region, a second layer and/or a second section without departing from the teachings of the present disclosure.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the element or feature in the figures is turned over, elements described as "below" or "beneath" other elements or features would then be oriented "on" or "above" the other elements or features. Thus, the exemplary term "below" can encompass both an orientation of above and below.

Hereinafter, a cylindrical secondary battery according to an embodiment of the present disclosure will be described, in detail, with reference to the accompanying drawings. For convenience, the following description will refer to the upper part as the upper direction and the lower part as the lower direction as shown in FIGS. 1 and 2.

Figure 1:
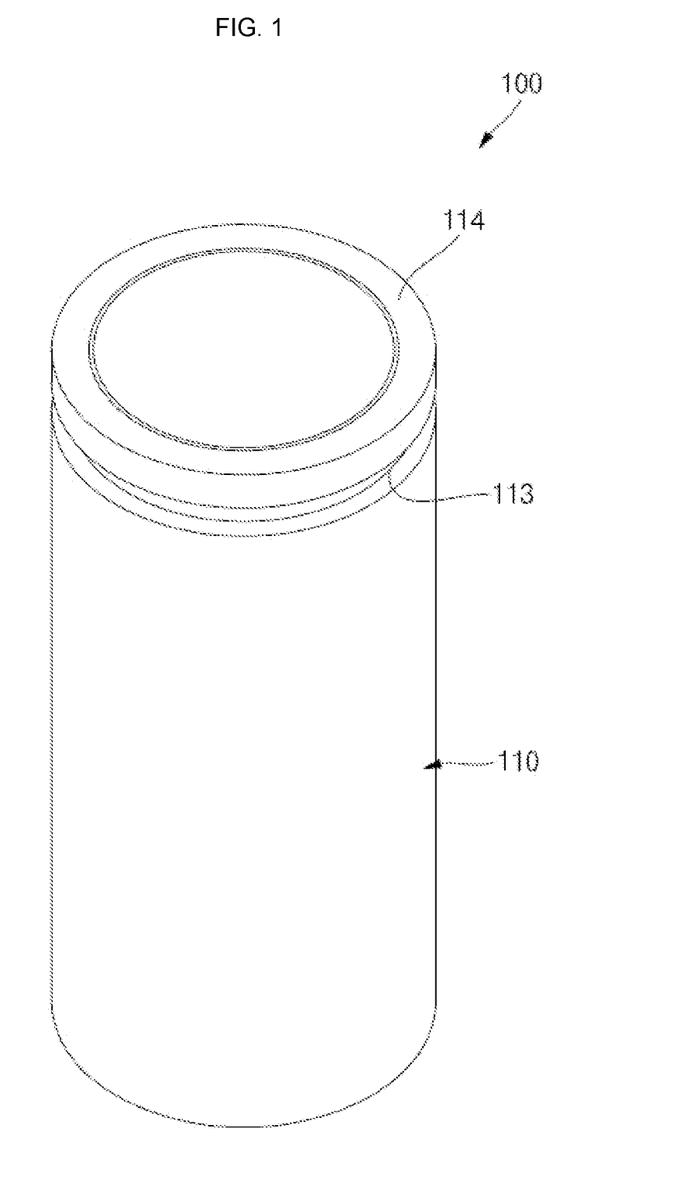
FIG. 1 is a perspective view of a cylindrical secondary battery according to embodiments of the present disclosure.
Figure 2:
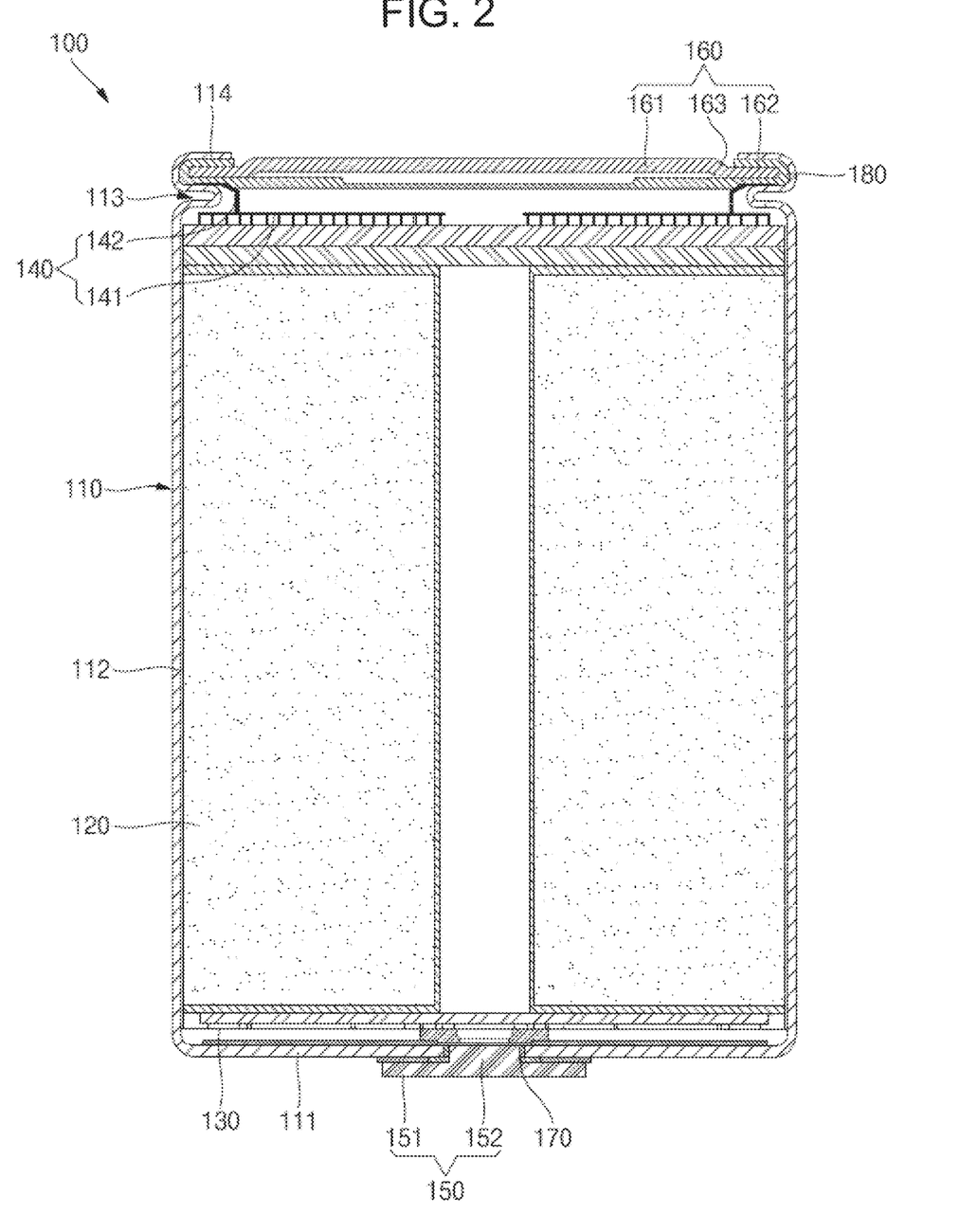
FIG. 2 is a cross-sectional view of the cylindrical secondary battery shown in FIG. 1.

FIG. 1 is a perspective view of a cylindrical secondary battery according to embodiments of the present disclosure, and FIG. 2 is a cross-sectional view of the cylindrical secondary battery shown in FIG. 1.

As shown in FIGS. 1 and 2, the cylindrical secondary battery 100, according to an embodiment of the present disclosure, may include a case 110, an electrode assembly 120 accommodated inside the case 110, a terminal 150 coupled to a terminal hole (e.g., a terminal opening) at one end of the case 110, and a cap plate 160 sealing an opening at another end (e.g., the opposite end) of the case 110.

The case 110 has a circular bottom portion 111 and a side portion 112 extending a length (e.g., a predetermined length) from an edge portion of the bottom portion 111 in an upward direction. An upper portion of the side portion 112 may be open. The bottom portion 111 and the side portion 112 of the case 110 may be integrally formed.

The circular bottom portion 111 may have a flat, circular plate shape and may have a terminal hole (e.g., a terminal opening) penetrating (or extending through) the central portion thereof. The terminal 150 may be coupled to the bottom portion 111 by inserting it into the terminal hole. A first gasket 170 for sealing and electrical insulation may be interposed between the terminal hole and the terminal 150. The first gasket 170 may electrically separate (or electrically isolate) the terminal 150 and the case 110 from each other by blocking (or preventing) contact therebetween. The terminal hole in the bottom portion 111 of the case 110 may be sealed by the first gasket 170. The first gasket 170 may be made of a resin material, such as polyethylene (PE), polypropylene (PP), or polyethylene terephthalate (PET).

As described above, during the manufacturing process of the cylindrical secondary battery 100, the upper portion of the case 110 may be open, and the electrode assembly 120 may be inserted into the case 110 together with an electrolyte through the open upper portion. After the electrolyte and the electrode assembly 120 are inserted into the case 110, the cap plate 160 may be coupled to the open upper portion to seal the inside of the case 110. The electrolyte enables movement of lithium ions between a positive electrode plate and a negative electrode plate of the electrode assembly 120.

The electrolyte may be a non-aqueous organic electrolyte solution that is a mixture of a lithium salt and a high-purity organic solvent. In addition, the electrolyte may be a polymer using a polymer electrolyte or a solid electrolyte, but the type of electrolyte is not limited herein.

The case 110 may be formed of steel, steel alloy, nickel-plated steel, nickel-plated steel alloy, aluminum, aluminum alloy, or an equivalent thereof, but the material is not limited thereto. In addition, to prevent the electrode assembly 120 from escaping to the outside of the case 110, an inwardly recessed beading part 113 may be formed in the case 110 at the lower portion of (e.g., below) the cap plate 160 and an inwardly bent crimping part 114 may be formed in the case 110 at the upper portion of (e.g., above) the cap plate 160. In other words, after the electrode assembly 120 is inserted through the open upper end of the case 110, the beading part 113 and the crimping part 114 are formed to prevent the electrode assembly 120 from separating from the case 110.

The beading part 113 may be formed by pressing the side portion 112 of the case 110 toward the inside of the electrode assembly 120 such that the beading part 113 may be formed to be concave when viewed from the outside of the case 110. That is, the beading part 113 may protrude inwardly in a ring shape along the circumference of the side portion 112 of the case 110. The beading part 113 may push and press a second gasket 180 from the outside to the inside of the case 110 (e.g., toward the winding center of the electrode assembly 120), thereby improving sealing of the cylindrical secondary battery 100 through of the second gasket 180. Accordingly, the beading part 113 may be formed at a portion of the case 110 that contacts the second gasket 180.

The beading part 113 is formed on the inner circumferential surface of the side portion 112 adjacent to the open upper end and may protrude toward the winding center of the electrode assembly 120. In one embodiment, the cap plate 160 may be seated on the beading part 113 to be primarily supported, and the second gasket 180, which will be described later, may contact a second current collector plate 140 to be secondarily supported. Thus, the cap plate 160 may be stably supported.

The electrode assembly 120 may include a first electrode plate, a second electrode plate, and a separator. The first electrode plate may be a positive electrode plate, and the second electrode plate may be a negative electrode plate. Of course, the opposite is also possible. Hereinafter, for convenience of explanation, an embodiment in which the first electrode plate is a positive electrode plate, and the second electrode plate is a negative electrode plate will be described.

The first electrode plate may include a plate-shaped metal foil made of aluminum (Al) having a positive electrode active material made of a transition metal oxide coated on at least one surface thereof. In addition, the first electrode plate may have a positive electrode uncoated portion that is not coated with the positive electrode active material at a lower portion thereof. The positive electrode uncoated portion may protrude downwardly from the electrode assembly 120.

The second electrode plate may include a plate-shaped metal foil made of copper (Cu) or nickel (Ni) having a negative electrode active material, such as graphite or carbon, coated on at least one surface thereof. In addition, the second electrode plate may have a negative electrode uncoated portion that is not coated with the negative electrode active material at an upper portion thereof. The negative electrode uncoated portion may protrude toward the top of the electrode assembly 120.

The separator may be made of polyethylene (PE) or polypropylene (PP) but is not limited thereto. The separator may prevent an electrical short between the first electrode plate and the second electrode plate while allowing the movement of lithium ions therebetween.

After the first electrode plate, the second electrode plate, and the separator are stacked, the electrode assembly 120 may be wound from a winding end to have a substantially cylindrical shape. In addition, in the electrode assembly 120, the positive electrode uncoated portion, which is not coated with the positive electrode active material, may protrude downwardly from the first electrode plate, and the negative electrode uncoated portion, which is not coated with the negative electrode active material, may protrude upwardly from the second electrode plate.

The first current collector plate 130 may be a circular metal plate having a shape corresponding to the lower surface of the electrode assembly 120. A planar size of the first current collector plate 130 may be equal to or smaller than a size of a lower surface of the electrode assembly 120. The first current collector plate 130 may be made of aluminum (Al). When the lower surface of the first current collector plate 130 is in contact with the lower surface of the electrode assembly 120, the first current collector plate 130 may be fixed by welding to be electrically connected to the first electrode plate exposed at the lower portion of the electrode assembly 120. When the lower surface of the first current collector plate 130 is in contact with the upper surface of the terminal, the first current collector plate 130 may be fixed, by welding, and electrically connected to the terminal 150. Thus, the first current collector plate 130 acts as a passage for current flow between the first electrode plate of the electrode assembly 120 and the terminal 150.

The second current collector plate 140 may have a circular planar part 141 corresponding to the upper surface of the electrode assembly 120 and an extension part 142 extending upwardly from an edge of the planar part 141. The lower surface of the planar part 141 may be in contact with the upper surface of the electrode assembly 120. When the lower surface of the planar part 141 is in contact with the upper surface of the electrode assembly 120, the planar part 141 may be fixed, by welding, and electrically connected to the second electrode plate exposed at the upper side of the electrode assembly 120.

The extension part 142 may extend upwardly from the edge of the planar part 141. The extension part 142 may be in contact with and coupled to the beading part 113 of the case 110. In one embodiment, when the extension part 142 is in contact with the inner surface of the beading part 113 of the case 110, the extension part 142 may be coupled thereto by welding. In addition, the extension part 142 may include a plurality of extension parts that are spaced apart from each other along the edge of the planar part 141. The second current collector plate 140 may act as a current flow passage between the second electrode plate of the electrode assembly 120 and the case 110. For example, the case 110 may be a negative electrode terminal.

The terminal 150 may be inserted into the terminal hole in the bottom portion of the case 110 and electrically connected to the first current collector plate 130. For example, the terminal 150 may be a positive electrode terminal. The terminal 150 and the case 110 may have different polarities. The terminal 150 may be made of the same or similar material as the first current collector plate 130 and the first electrode plate. A diameter of a portion of the terminal 150 exposed to a lower portion of the case 110 and a diameter thereof positioned inside the case 110 may be larger than a diameter thereof positioned in the terminal hole.

The terminal 150 may include a head 151 exposed at (or from) the lower portion of the case 110 and a fastening part 152 located inside (e.g., extending inside) the case 110 and facing the electrode assembly 120. The terminal 150 may be coupled to the terminal hole in the case 110 from the outside to the inside. The head 151 may be located outside the case 110. In addition, the fastening part 152 may be compressively deformed (e.g., compressively molded) by riveting and compressed with the first gasket 170 interposed on the top of (e.g., the inside of) the bottom portion 111. The fastening part 152 may have a larger diameter from the terminal hole toward the inside of the case 110. In addition, the head 151 may come into close contact with the lower portion of (e.g., the outer surface of) the bottom portion 111 in a state in which the first gasket 170 is interposed therebetween. The first gasket 170 may be interposed between the terminal 150 and the terminal hole, and thus, the terminal 150 and the case 110 may be electrically insulated from each other and sealed therebetween. The terminal 150 may be electrically connected to the first electrode plate of the electrode assembly through the first current collector plate 130.

The cap plate 160 is a circular metal plate and may be coupled to an upper end of the case 110. An upper surface of the cap plate 160 may be exposed to the outside. The cap plate 160 is coupled to the upper end of the case 110 with the second gasket 180 is interposed therebetween so that an electrical connection with the case 110 is prevented. Because the cap plate 160 is not electrically connected to the positive electrode or the negative electrode of the electrode assembly 120, it may not an electrical polarity (e.g., it may be electrically floating). The cap plate 160 may be made of aluminum, aluminum alloy, or an equivalent thereof. The cap plate 160 may have a thickness in a range of about 0.7 mm to about 1.2 mm.

The cap plate 160 may have an edge region 162 interposed between the crimping part 114 and the beading part 113 and a central region 161 that is convexly formed toward (e.g., that protrudes toward) the outside of the case 110 compared to the edge region 162. The cap plate 160 may be fixed in a state in which an end of the edge region 162 is positioned between the beading part 113 and the crimping part 114 of the case 110. For example, the cap plate 160 may be seated on the second gasket 180 when the second gasket 180 is on the beading part 113 of the case 110.

Thereafter, the crimping part 114 of the case 110 may be bent toward the inside of the cap plate 160 to press the second gasket 180, and thus, the cap plate 160 and the case 110 may be coupled to each other. The second gasket 180 may seal the case 110 and the cap plate 160 by pressing the same, thereby preventing the cap plate 160 from being separated from the case 110.

The cap plate 160 may have a central region 161 and an edge region 162 extending outwardly from the central region 161 and having an end interposed between the beading part 113 and the crimping part 114 of the case 110 to be coupled to the case 110. Compared to the edge region 162, the central region 161 may be convexly formed toward the outside of the case 110. In one embodiment, the edge region 162 of the cap plate 160 may be positioned lower than the central region 161, and thus, a step may be formed in the cap plate 160. The cap plate 160 may further include a connection area 163 connecting (or extending between) the central region 161 and the edge region 162. The connection area 163 may be inclined.

The cap plate 160 may be disposed on the second gasket 180 when the second gasket 180 is disposed on the second current collector plate 140. The second gasket 180 and the upper end of the case 110 are deformed together so that an edge of the cap plate 160 is covered, and thus, the cap plate 160 may be fixed to the case 110. In addition, a notch is formed in the cap plate 160 to act as a vent that is broken (e.g., that bursts) when internal pressure is generated inside the case 110. In some embodiments, the cap plate 160 may act as a current interrupt device (CID) to block a current path by deforming due to internal pressure or may act as a fuse to block a current path by having a part that melts at high heat. The cap plate 160 is a substantially disk shape and should not come into contact with the second current collector plate 140 or the negative electrode plate when it is disposed on the second gasket 180. Accordingly, when viewed from the side, the plate surface of the central region 161 at the center thereof may be higher than the edge region 162 fixed to the second gasket 180. That is, the cap plate 160 may have a disk shape in which a central portion is raised upwardly.

That is, in one embodiment, the second gasket 180 may be interposed between the case 110 and the cap plate 160 to electrically insulate the case 110 and the cap plate 160 from each other. In such an embodiment, the cap plate 160 will be electrically nonpolar. Therefore, in the cylindrical secondary battery 100, according to an embodiment, the terminal 150 is provided on one side of the case 110, instead of the cap plate 160, and thus, the negative electrode and the positive electrode may both be provided on the one side of the case 110.

In FIGS. 1 and 2, the cylindrical secondary battery 100 is shown in a state in which the cap plate 160 and the second gasket 180 are accommodated in the case 110 and sealed.

The upper portion of the case 110 may be bent toward the center of the case 110 through a crimping process and may be deformed to surround the upper portion of the cap plate 160 and the upper periphery of the second gasket 180. That is, after the cap plate 160 and the second gasket 180 are accommodated in the case 110, the second gasket 180 and the cap plate 160 may come into close contact with each other when the beading part 113 and the crimping part 114 are formed. Accordingly, the lower end of the second gasket 180 may block (or prevent) contact between the beading part 113 and the cap plate 160 by being positioned therebetween.

In one embodiment, the second gasket 180 may cover an outer circumference of the cap plate 160 while being interposed between the case 110 and the cap plate 160. In one embodiment, the outer surface of the second gasket 180 may be in close contact with the beading part 113 and the crimping part 114 of the case 110, and an inner surface of the second gasket 180 may adhere to an outer circumference of the cap plate 160. That is, the second gasket 180 may seal the case 110 and the cap plate 160 and, at the same time, may act as an electrical insulator therebetween. To this end, the second gasket 180 may be assembled with the cap plate 160 and then assembled with the case 110 to form and maintain cell sealing. Therefore, the sidewall of the case 110 and the cap plate 160 may be sealed and insulated by the second gasket 180. In one embodiment, a gasket may be integrated with an upper insulating plate without a separate upper insulating plate to insulate the electrode assembly 120 and the case 110 from each other. In such an embodiment, the gasket acts as an upper insulating plate.

Figure 3:
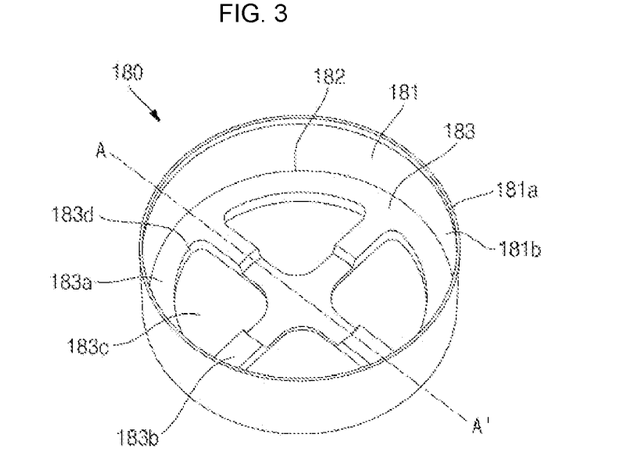
FIG. 3 is a perspective view of a gasket before assembly according to an embodiment.

Referring to FIG. 3, the second gasket 180 may have a sidewall portion 181, a bottom portion 183, and a corner portion 182 between the sidewall portion 181 and the bottom portion 183.

That is, in one embodiment, the sidewall portion 181 of the second gasket 180 extends upwardly from the bottom portion 183, and the sidewall portion 181 may be deformed inwardly along with the case 110 to wrap (e.g., to cover) the edge of the cap plate 160. Therefore, the height of the sidewall portion 181 (e.g., the vertical length thereof from the bottom portion 183 to the top of the sidewall portion 181) may be greater than the distance between the upper end of the electrode assembly 120 and the upper edge of the case 110 in a state in which the electrode assembly 120 is inserted into the case 110. For example, when viewed from the outside of the case 110, the second gasket 180 may be shaped such that the height of the sidewall portion 181 rises higher than (e.g., extends above or extends beyond) the upper end of the case 110.

An assembling process of the second gasket 180 into the cylindrical secondary battery 100 will now be described in more detail. In one embodiment, in a state in which the electrode assembly 120 is inserted into the case 110, the second gasket 180 may first be disposed on top of the electrode assembly 120. The second gasket 180 may be in a state of being inserted into the case 110 with the sidewall portion 181 extending above the upper end of the case 110 and protruding to (or protruding from) the upper portion of the case 110. Thereafter, the cap plate 160 may be disposed on (or disposed in) the second gasket 180. Then, the upper end of the case 110 may be deformed from the outside to the inside (e.g., in the direction toward the winding center of the electrode assembly 120). The second gasket 180 may be deformed and folded together with the case 110. Accordingly, because the sidewall portion 181 of the second gasket 180 comes into close contact with the end portion of the cap plate 160, the end portion may be pressed by the sidewall portion 181 of the second gasket 180 and the upper end of the side portion 112 of the case 110 to be fixed. That is, the cap plate 160 is fixed to the case 110 with the second gasket 180 disposed therebetween.

In an embodiment, an end region 181a, which is a part of (or a portion of) the sidewall portion 181 of the second gasket 180, may be positioned between the outer surface of the end of the cap plate 160 and the inner surface of the end region of the case 110. The end region 181a may be referred to as a folded sidewall portion 181 of the second gasket 180. The end region 181a of the sidewall portion 181 may protrude more toward the winding center of the electrode assembly 120 than (e.g., may protrude inwardly farther than) the beading part 113 of the case 110. The height of the sidewall portion 181 of the second gasket 180 is greater than the height of the upper end of the side portion 112 of the case 110 when the second gasket 180 is inserted into the case 110. Because the covering length of the second gasket 180 is greater than that of the case 110, insulation between the cap plate 160 and the case 110 is ensured. In some embodiments, when the gasket does not need to act as an insulating and only needs to seal, the side surface height of the gasket may be lower than the upper end height of the side portion of the case.

In one embodiment, as described above, in manufacturing the cylindrical secondary battery 100, after mounting (e.g., inserting) the cap plate 160, the end region of the side portion 112 of the case 110 is processed by bending (e.g., is bent) such that the end region 181a of the sidewall portion 181 of the second gasket 180 may also be processed by bending (e.g., may also be bent), thereby arranging the end region 181a of the sidewall portion 181 of the second gasket 180 to cover the end of the cap plate 160. That is, due to the bending, the end region 181a of the second gasket 180 may be recessed inwardly (e.g., may extend inwardly) so that sealing capacity can be further increased, thereby improving sealing capacity against leakage of electrolyte, etc.

The end region 181a may be disposed between the inner surface of the case 110 and the upper surface of the cap plate 160. In addition, a circular ring region 181b, which is a portion of the sidewall portion 181 other than the end region 181a (e.g., which is the remaining portion of the sidewall portion 181), may be disposed between the inner surface of the case 110 and the side surface of the cap plate 160 and may come into close contact with the sidewall of the case 110. In addition, the bottom portion 183 of the second gasket 180 may be disposed between the inner surface of the case 110 and the lower surface of the cap plate 160 and may come into contact with the extension part 142 (or electrode tab). Although the end region 181a, the circular ring region 181b, and the bottom portion 183 are illustrated as being integrally formed with one another, the end region 181a, the circular ring region 181b, and the bottom portion 183 can be separately formed in other embodiments. For convenience of explanation, the following description will be given with respect to an embodiment in which the end region 181a, the circular ring region 181b, and the bottom portion 183 are integrally formed with one another as shown in the drawings.

In one embodiment, the bottom portion 183 and the sidewall portion 181 of the second gasket 180 may be perpendicular to each other, and the sidewall portion 181 may have a cylindrical shape. In addition, the corner portion 182 between the bottom portion 183 and the sidewall portion 181 may be a bent portion with sharp corners (e.g., forming a right angle or a substantially right angle) or may be a curved portion with rounded corners. For example, in one embodiment, the bottom portion 183 and the sidewall portion 181 of the second gasket 180 may be connected to each other via the corner portion 182. For example, when the corner portion 182 may be the curved portion, a concave shape curved to have a curvature (e.g., a predetermined curvature) and may facilitate the flow of resin.

In addition, in one embodiment, because the second gasket 180 is inserted into the case 110, the diameter of the bottom portion 183 may be smaller than that of the case 110.

In one embodiment, the material of the second gasket 180 may be polypropylene resin (PP) or polybutylene terephthalate resin (PBT), but it is not limited thereto. For example, the material of the second gasket 180 may be other polyolefin-based resins, polyester-based resins, or polyether-based resins. In addition, a tar coating may be used as (or coated on) the material of the second gasket 180. Accordingly, continuous protection of the coating layer can be provided and the adhesion of contaminants thereto can be prevented. In addition, because peeling of the coating layer may be suppressed by the tar, the corrosion rate may be reduced, thereby maintaining durability owing to excellent mechanical strength and physical properties.

In one embodiment, in the cylindrical secondary battery 100, as the diameter of the case 110 increases, the diameter of the second gasket 180 also increases. That is, as the diameter of the second gasket 180 increases, heat shrinkage deformation may occur in the second gasket 180 after injection (e.g., after injection molding) and problems, such as dimensional defects and the like, may occur. Accordingly, in an embodiment, to eliminate a difference in molding sizes before and after processing, a support structure is formed for (e.g., is formed in) the central portion of the bottom surface of the second gasket 180. Accordingly, the gasket support area is increased compared to a conventional structure in which only the edge of the cap plate is supported, thereby minimizing deformation of the cap plate. For example, in one embodiment, by forming a bridge shape or a hole shape in the bottom surface of the gasket, deformation of the gasket can be reduced or prevented. Therefore, during assembly of parts, lifting can be prevented, thereby improving quality. In addition, deformation before and after processing can be improved, thereby enabling uniform size management.

Accordingly, in one embodiment, a hole or pierced portion may be formed in the bottom portion 183 of the second gasket 180, and an electrolyte or gas may be discharged through the hole or pierced portion. The hole or pierced portion in the bottom portion 183 may have a pattern (e.g., a specific pattern). For example, the hole may have a round, oval, or kidney bean shape. In addition, in one embodiment, the bottom portion 183 of the second gasket 180 may be parallel to the bottom portion 111 of the case 110 and the cap plate 160. In addition, the bottom portion 183 may have a disk shape.

In one embodiment, in the bottom portion 183, bridges may be formed with openings being formed between the bridges. In one embodiment, each of the openings may be in the form of the hole. That is, in one embodiment, the terms opening and hole may have the same meaning. In one embodiment, the bridge structure may have a cross or straight shape across the circular second gasket 180, and thus, openings (e.g., holes) may be formed between the bridges. Hereinafter, a detailed description of the second gasket 180, including the shape of the bottom portion 183, will now be described with reference to FIGS. 3 to 7.

Figure 4:
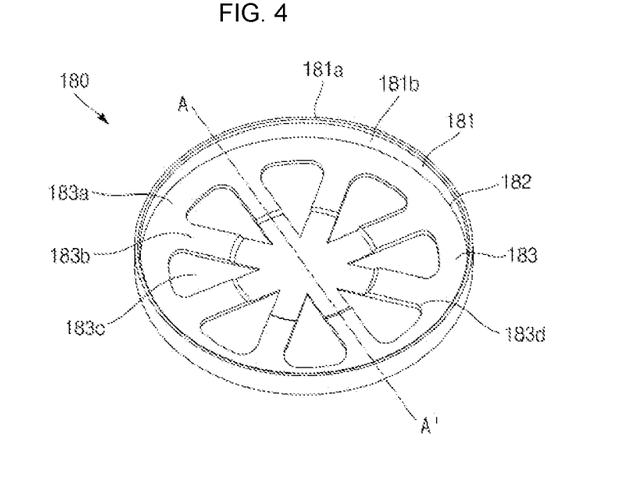
FIG. 4 is a perspective view of a gasket before assembly according to another embodiment.
Figure 5:
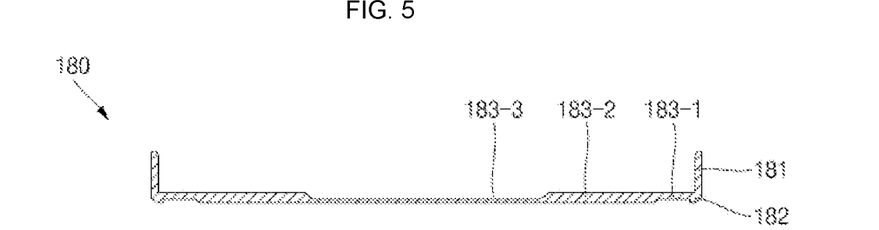
FIG. 5 is a cross-sectional view taken along the line A-A' in FIGS. 3 and 4.
Figure 6:
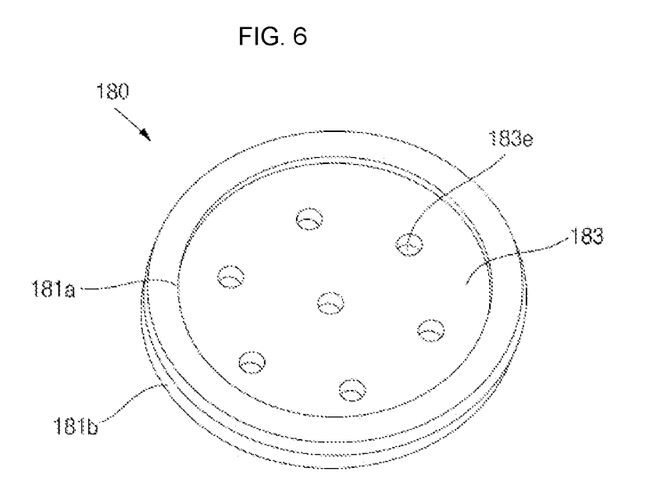
FIG. 6 is a perspective view of a gasket according to another embodiment.
Figure 7:
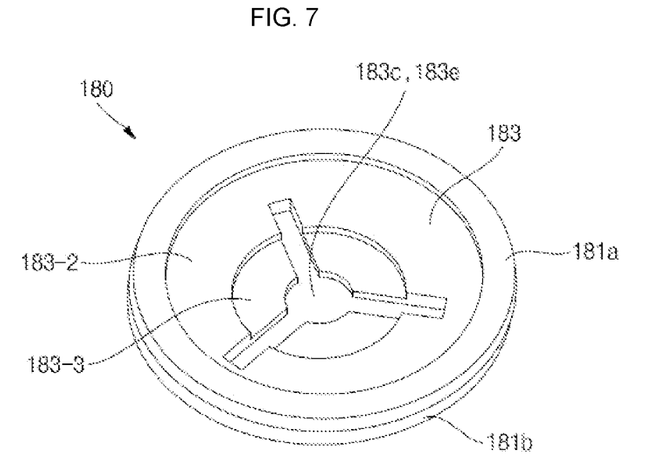
FIG. 7 is a perspective view of a gasket according to another embodiment.

FIG. 3 is a perspective view of a gasket before assembly according to an embodiment, FIG. 4 is a perspective view of a gasket before assembly with an increased number of bridges according to another embodiment, FIG. 5 is a cross-sectional view taken along the line A-A' in FIGS. 3 and 4, FIG. 6 is a perspective view of a gasket having a hole according to another embodiment, and FIG. 7 is a perspective view of a gasket having a central circular opening according to another embodiment.

Referring to FIGS. 3 to 5, the second gasket 180 may have the sidewall portion 181 in close contact with the inner surface of the side portion 112 of the case 110 and may have open upper and lower portions. In addition, the second gasket 180 may have a bottom portion 183 extending inwardly perpendicular to the sidewall portion 181. The bottom portion 183 may have a disk shape and may be parallel to the bottom portion 111 of the case 110 and the cap plate 160.

The bottom portion 183 may have flange parts 183*a* connecting (e.g., extending between) the sidewall portion 181 and a central region 183-2 to an edge region 183-1, which is an end portion (e.g., a peripheral portion) of the disk shape. The flange parts 183*a* may extend inwardly from the bottom surface of the sidewall portion 181.

In addition, the bottom portion 183 may have a bridge part 183*b* formed in the disk-shaped central region 183-2 to connect the flange parts 183*a* to each other and an opening 183*c* between the bridge parts 183*b*.

Referring to FIG. 3, the opening 183*c* may have, but is not limited to, a triangular shape, and when one bridge part 183*b* is provided in a straight line, the opening 183*c* may have a semicircular shape. In addition, referring to FIG. 4, the bridge part 183*b* may include of a plurality of bridge parts. Therefore, the bridge part 183*b* may be formed of, for example, between one and twenty bridge parts. In one embodiment, a bridge in a straight line crossing (e.g., extending between) the flange part 183*a* may be counted as one bridge, but in another embodiment, a bridge extending to a central portion at where bridges cross each other in the flange part 183*a* may also be counted as one bridge. In this case, the number of bridges may be two or more.

As shown in FIGS. 3 and 4, the bridge part 183*b* may be formed in a straight line shape across a disk (e.g., in a case where two bridges are provided) or a bridge forming a cross shape across a disk (e.g., in a case where four or more bridges are provided). In addition, in one embodiment, a round portion 183*d* may be provided on the inner side of the opening 183*c*. The round portion 183*d* may be formed at a connection portion between the flange part 183*a* and the bridge part 183*b*. The round portion 183*d* can be a concave shape curved to have a curvature (e.g., a predetermined curvature) and may facilitate the flow of resin.

In addition, the round portion 183*d* may be formed at a connection portion between the bridge parts 183*b*. However, in such an embodiment, and referring to FIG. 4, when the number of bridges is increased to a certain number or more (e.g., the bridges can no longer be formed in a round shape), the round portion 183*d* may be formed in a bent shape.

In one embodiment, the thicknesses of the bridge parts 183*b* may be the same or different across the entire area within the central region 183-2. As shown in FIG. 5, when the thicknesses of the bridge parts 183*b* are different, the thickness of the central portion 183-3 in the central region 183-2 may be smaller than that of the other central region 183-2. In this case, a step may be formed between the central region 183-2 and the central portion 183-3. In one embodiment, the thickness of the central portion 183-3 of the bridge part 183*b* may be equal to or smaller than the thickness of the flange part 183*a*. That is, the thickness of a portion of the bridge part 183*b* may be smaller than that of the flange part 183*a*.

In addition, in one embodiment, the flange part 183*a* may be formed above the bridge part 183*b* from the bottom surface. In such an embodiment, the thickness of the flange part 183*a* may be smaller than the thickness of the corner portion 182 between the flange part 183*a* and the sidewall portion 181, and a step may be formed between the lower surface between the flange part 183*a* and the corner portion 182. In one embodiment, a step may be formed between the flange part 183*a* and the bridge part 183*b* and between the flange part 183*a* and the corner portion 182, and thus, the flange part 183*a* may be concavely formed from the bottom surface to an upper portion. Accordingly, the extension part 142 may come into contact with the concave space.

In addition, even when the thickness of the central region 183-2 of the bridge part 183*b* and the thickness of the central region 183-3 of the central region 183-2 are different, the thicknesses of the bridge part 183*b* across the entire area may be smaller than that of the flange part 183*a*.

In another embodiment, even when the thickness of the central area 183-2 and the thickness of the central portion 183-3 are the same, the bridge part 183*b* may have a thickness that is smaller than that of the flange part 183*a* across the entire area of the bridge part 183*b*.

For example, the thickness of the bridge part 183*b* across the entire area of the bridge part 183*b* may be smaller than the thickness of the flange part 183*a*, and in such an embodiment, a step may be formed between the bridge part 183*b* and the flange part 183*a*.

As shown in FIG. 6, according to another embodiment, instead of a bridge shape being formed in the central region 183-2 of the bottom portion 183, and a hole 183e having a pattern (e.g., a specific pattern) may be formed after being filled with a material. For convenience of explanation, the hole 183e and the opening 183c are separately described, but it may be considered that the hole shape is also included in (e.g., is coextensive with) the opening 183c. FIG. 6 shows that the sidewall portion 181 may have a bent shape (e.g., shows the sidewall portion 181 in a bent or folded configuration). Therefore, a folded portion of the sidewall portion 181 may be referred to as an end region 181a and a portion other than the folded portion may be referred to as a circular ring region 181b. In one embodiment, seven holes 183e are formed in the drawing, but the number of holes 183e are not limited thereto.

As shown in FIG. 7, according to another embodiment, a circular opening 183c may be formed in the central portion 183-3 of the central region 183-2 of the bottom portion 183, and radial straight openings 183c may be formed from (e.g., may extend from) the circular opening 183c in the central portion 183-3. FIG. 7 shows that the sidewall portion 181 may have a bent shape (e.g., shows the sidewall portion 181 in a bent or folded configuration). Therefore, a folded portion of the sidewall portion 181 may be referred to as an end region 181a and a portion other than the folded portion may be referred to as a circular ring region 181b. In addition, referring to FIG. 7, the central region 183-2 and the central portion 183-3 may have different thicknesses. In such an embodiment, a step may be formed between the central region 183-2 and the central portion 183-3. In addition, in one embodiment, three radial straight openings 183c are formed in the drawing, but the number of radial straight openings 183c is not limited thereto.

As described above, according to embodiments of the present disclosure, by forming a support structure for the central portion of a bottom surface of a gasket, the quality thereof can be improved by reducing or eliminating a difference in molding sizes before and after processing when the diameter has increased in response to the diameter of a case. Accordingly, because the support area of the gasket is increased compared to a conventional structure in which only the edge portion of the cap plate is supported, deformation of the cap plate may be reduced or minimized, thereby improving reliability of a product.

In addition, according to embodiments of the present disclosure, by forming a bridge shape or a hole shape in the bottom surface of the gasket, deformation of the gasket can be reduced or prevented and quality can be improved by preventing lifting during assembly of parts. As a result, deformation before and after processing is improved, thereby enabling uniform size management.

The foregoing embodiments are only some embodiments for carrying out the present disclosure, which is not limited to the described embodiments. Thus, it will be understood by a person skilled in the art that various changes in form and details may be made therein without departing from the spirit and scope of the present disclosure as defined by the following claims and their equivalents.

What is claimed is:

1. A cylindrical secondary battery comprising:
   an electrode assembly comprising a first electrode plate, a separator, and a second electrode plate;
   a cylindrical case having a central axis, accommodating the electrode assembly, and electrically connected to the second electrode plate, an upper end of the case being open;
   a terminal passing through a lower surface of the case and electrically connected to the first electrode plate and coupled to the case through a first gasket;
   a cap plate sealing the upper end of the case; and
   a second gasket between the case and the cap plate to seal and insulate the case and the cap plate, the second gasket having:
      a sidewall portion in direct contact with a side surface of the case and at least partially extending in a direction parallel to the central axis;
      a corner portion at a proximal end of the sidewall portion and being bent from the direction parallel to the central axis to a direction perpendicular to the central axis; and
      a bottom portion extending inwardly from the corner portion in the direction perpendicular to the central axis and having at least one opening formed therein, the bottom portion of the second gasket having flange parts extending from the corner portion in an edge region and a bridge part connecting the flange parts to each other,
   wherein the bottom portion has the edge region extending from the corner portion, a central region inside the edge region, and a central portion inside the central region,
   wherein a thickness of the corner portion in the direction parallel to the central axis is larger than a thickness of the edge region in the direction parallel to the central axis, and
   wherein a thickness of the central portion in the direction parallel to the central axis is smaller than a thickness of the central region in the direction parallel to the central axis.

2. The cylindrical secondary battery as claimed in claim 1, wherein the sidewall portion of the second gasket has a circular ring shape with open upper and lower portions.

3. The cylindrical secondary battery as claimed in claim 1, wherein the bottom portion of the second gasket has a disk shape, and
   wherein a diameter of the bottom portion is smaller than a diameter of the case.

4. The cylindrical secondary battery as claimed in claim 1, wherein the at least one opening is between the bridge part or between the bridge part and the flange parts.

5. The cylindrical secondary battery as claimed in claim 1, wherein the bottom portion of the second gasket has a round portion at an inner side of the at least one opening and bent in a round shape between the flange parts and the bridge part.

6. The cylindrical secondary battery as claimed in claim 1, wherein steps are formed between regions of the bridge part having different thicknesses.

7. The cylindrical secondary battery as claimed in claim 1, wherein a thickness of the bridge part is equal to or smaller than that of the flange parts.

8. The cylindrical secondary battery as claimed in claim 1, wherein a thickness of a portion of the bridge part is equal to or smaller than that of the flange parts.

9. The cylindrical secondary battery as claimed in claim 1, wherein a thickness of a portion of the bridge part is greater than that of the flange parts.

10. The cylindrical secondary battery as claimed in claim 1, wherein the second gasket has a corner portion extending between the sidewall portion and the bottom portion, and
    wherein a thickness of the flange parts is equal to or smaller than a thickness of the corner portion.

11. The cylindrical secondary battery as claimed in claim 1, wherein the case comprises:

a crimping part bent inwardly at an upper portion of the cap plate to fix the cap plate; and a beading part recessed into the case at a lower portion of the cap plate.

12. The cylindrical secondary battery as claimed in claim 11, wherein the second gasket is between the cap plate and the crimping part and between the cap plate and the beading part, and wherein the cap plate is non-polar.

13. The cylindrical secondary battery as claimed in claim 11, wherein the second gasket has an upper end region on the sidewall portion, and wherein the upper end region is between an outer surface of an end of the cap plate and an inner surface of the crimping part.

14. The cylindrical secondary battery as claimed in claim 13, wherein the upper end region of the second gasket protrudes farther inwardly than the crimping part.

15. The cylindrical secondary battery as claimed in claim 11, wherein the cap plate has an edge region between the crimping part and the beading part and a central region concavely formed in an outer direction of the case compared to the edge region.

16. The cylindrical secondary battery as claimed in claim 12, wherein the first electrode plate has a positive electrode uncoated portion that is not coated with a positive active material that protrudes downwardly from the first electrode plate, and wherein the second electrode plate has a negative electrode uncoated portion that is not coated with a negative active material and protrudes upwardly from the second electrode plate.

17. The cylindrical secondary battery as claimed in claim 16, further comprising a current collector plate having a circular plate shape corresponding to an upper surface of the electrode assembly and contacting and electrically connected to the second electrode plate exposed at the upper surface of the electrode assembly.

18. The cylindrical secondary battery as claimed in claim 17, wherein the current collector plate has:

a circular planar part contacting the upper surface of the electrode assembly; and an extension part extending upwardly from an edge of the planar part.

19. The cylindrical secondary battery as claimed in claim 18, wherein the extension part of the current collector plate is between the second gasket and the beading part.

* * * * *